United States Patent [19]

McEwen

[11] Patent Number: 5,131,179
[45] Date of Patent: Jul. 21, 1992

[54] DUAL FISHING POLE HOLDERS ATTACHED TO PORTABLE FISH BUCKET

[76] Inventor: William H. McEwen, 6519 Eaglewing La., Fort Washington, Md. 20744

[21] Appl. No.: 766,097

[22] Filed: Sep. 27, 1991

[51] Int. Cl.⁵ ............................................. A01K 97/10
[52] U.S. Cl. .................................... 43/21.2; 43/54.1; 43/55; 248/539; 206/315.11
[58] Field of Search ......................... 43/21.2, 54.1, 55; 248/539, 514, 512; 206/315.11

[56] References Cited

U.S. PATENT DOCUMENTS

| | | | |
|---|---|---|---|
| 3,074,197 | 1/1963 | Schnars | 43/21.2 |
| 3,571,964 | 3/1971 | Bogathy | 43/21.2 |
| 3,603,019 | 9/1971 | Smeltzer | 43/21.2 |
| 3,659,369 | 5/1972 | Hermanson | 43/21.2 |
| 3,667,708 | 6/1972 | Smeltzer | 248/39 |
| 4,086,716 | 5/1978 | Donahue | 43/21.2 |
| 4,236,339 | 12/1980 | White | 43/21.2 |
| 4,845,881 | 7/1989 | Ward | 43/21.2 |

OTHER PUBLICATIONS

Popular Mechanics, vol. 101, No. 6, p. 184, Jun. 1954.

Primary Examiner—Kurt Rowan
Attorney, Agent, or Firm—Joseph Scafetta, Jr.

[57] ABSTRACT

A fishing device includes a portable fish bucket and two tripods attached on opposite sides of the bucket. Each of the tripods has two front legs pivotally connected by a first sleeve to a tube for holding a single fishing pole by its handle portion. Each of the tripods is secured by two different subcombinations to the bucket. The first subcombination includes a second sleeve slipped over an upper end of the tube and fastened by an elastic cord to a handle of the bucket. The second subcombination includes a leakproof nut and bolt arrangement connected through a lower end of the tube near to a bottom edge of the bucket. This nut and bolt arrangement allows the tube to be pivotally inclined at a selected angle from a vertical axis of the bucket. Thus, this device allows a fisher to have two unattended steady fishing pole lines in the water at the same time.

7 Claims, 4 Drawing Sheets

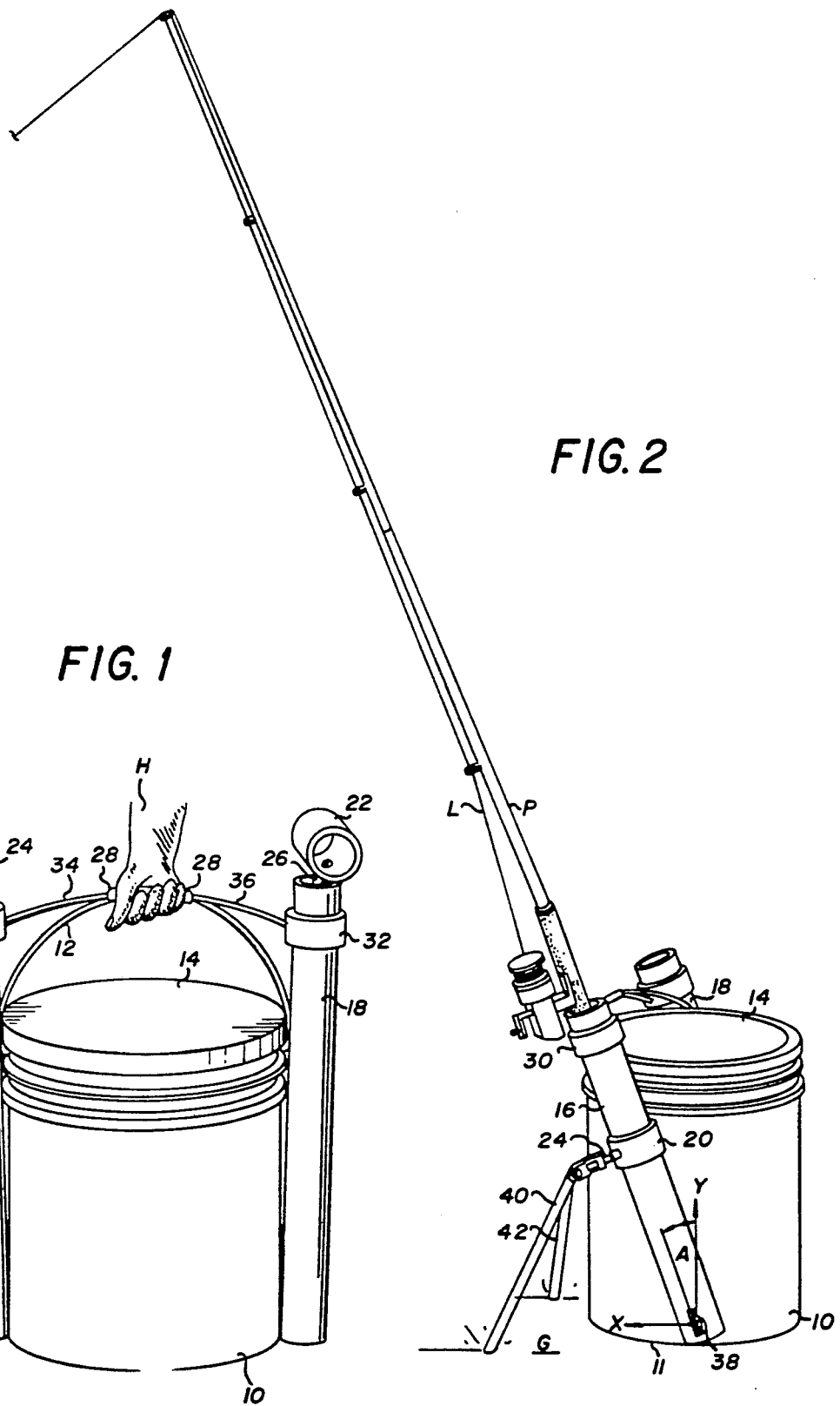

DUAL FISHING POLE HOLDERS ATTACHED TO PORTABLE FISH BUCKET

BACKGROUND OF THE INVENTION

1. Field of the Invention

This invention relates to fishing generally and, in particular, to rod holders and supports therefor.

2. Description of Related Art

It has been a problem in the prior art of fishing to develop a single device which allows a fisher to have two unattended steady fishing pole lines in the water at the same time. Although there are devices which allow the fisher to have a sole unattended steady fishing pole line in the water, such devices are complicated and have the potential of catching only the same number of fish as the fisher would catch with a single fishing pole in hand. Such prior art devices are exemplified by the following:

| U.S. Pat. No. | Inventor | Issue Date |
| --- | --- | --- |
| 3,603,019 | Smeltzer | Sep. 07, 1971 |
| 3,667,708 | Smeltzer | June 06, 1972 |
| 4,086,716 | Donahue | May 02, 1978 |
| 4,845,881 | Ward | July 11, 1989 |

Smeltzer discloses in his two patents a single fishing pole holder attached to a front side of a portable fish bucket. Flashlight holders are also attached to the bucket at opposite sides thereof. In his U.S. Patent that issued in 1971, Smeltzer shows in FIG. 6 rivets 56 that secure the flashlight holders 52 to the wall 14 of the bucket 10. In his U.S. Patent that issued in 1972, Smeltzer discloses different pivot mechanisms in FIGS. 4 and 5 for connecting the fishing pole holder and the flashlight holders, respectively, to the portable fish bucket.

Donahue discloses a tripod with two front legs pivotally connected to a support rod 11 to which a holder 13 is attached for containing a handle of a single fishing pole 21. However, there is no suggestion that such a tripod may be fastened to the side of a portable fish bucket.

Ward discloses, like Smeltzer, a single fishing pole holder attached to a front side of a portable fish bucket. Legs 31 pivot outwardly from opposite sides of the bucket to help secure it against tipping over in the event that a fish bites.

Thus, it remains a problem in the prior art of fishing to develop a single device which allows a fisher to have two unattended steady fishing pole lines in the water at the same time.

SUMMARY OF THE INVENTION

The invention relates to two fishing pole holders which are attached on opposite sides of a portable fish bucket. Each holder is basically a tripod with two front legs pivotally connected by a first sleeve to a cylindrical tube for holding a single fishing pole by its handle. Each tube is secured at one end near to the bottom edge of the fish bucket by a leakproof nut and bolt arrangement. Also, each tube may be secured at its upper end to the fish bucket by a second sleeve that is fastened by an elastic cord to a handle on the bucket.

The invention is patentable because it is neither obvious from nor disclosed by any known patents and publications to attach tripods to opposite sides of a portable fish bucket for the purpose of holding steady two unattended fishing poles at the same time. Also, it is neither obvious nor disclosed that one may secure each tube at its upper end to the fish bucket by a second sleeve that is fastened by an elastic cord to a handle of the bucket.

Thus, the present invention constitutes a portable fish bucket which is a single device that allows a fisher to have two unattended steady fishing pole lines in the water at the same time.

BRIEF DESCRIPTION OF THE DRAWINGS

FIG. 1 is a perspective view of the invention being carried in its disassembled condition.

FIG. 2 is a perspective view of the invention in its assembled condition on the ground.

DETAILED DESCRIPTION OF THE PREFERRED EMBODIMENT

Figure 3:
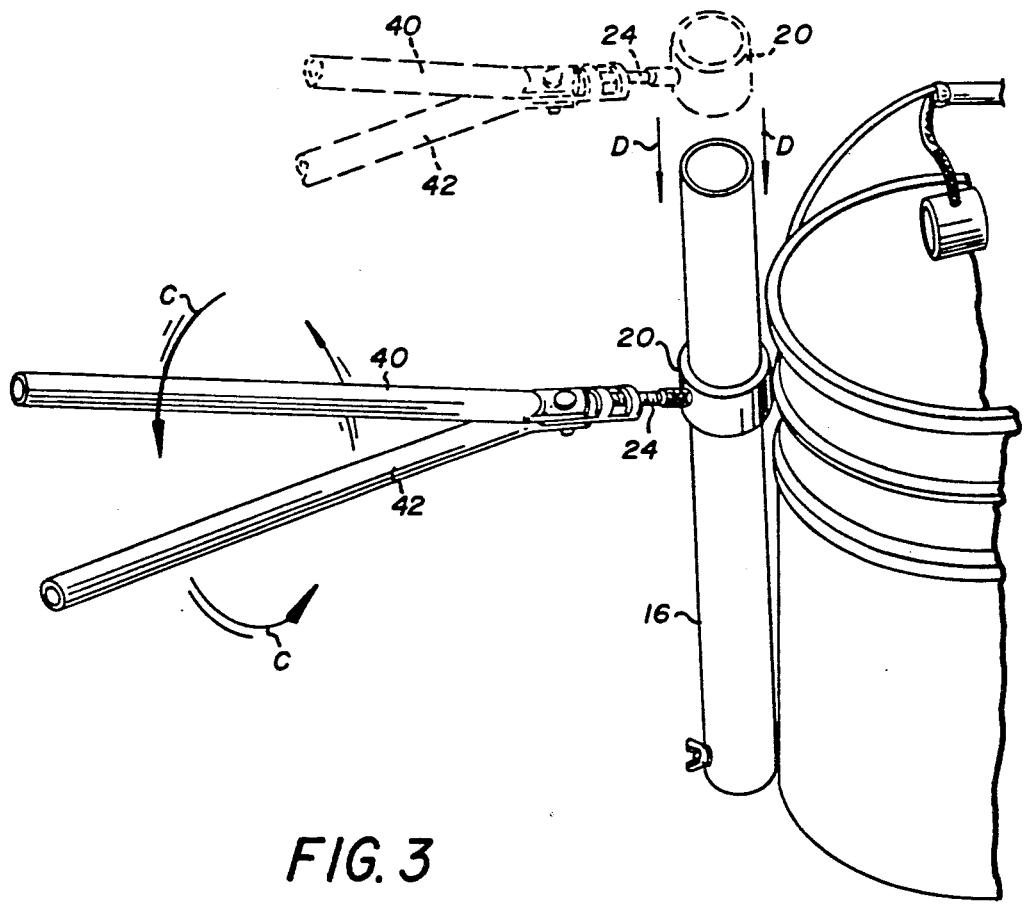
FIG. 3 is a perspective view of a first sleeve being slipped over and tightened onto a tube.

In FIG. 1, a bucket 10 having a handle 12 is shown being carried by a hand H of a fisher. A pair of first sleeves 20 and 22 are attached to bolts 24 and 26, respectively, which are shown protruding from tubes 16 and 18, respectively.

The bucket 10 also has a lid 14 which may be removed therefrom for the purpose of placing either bait or caught fish inside. If the bucket 10 contains some water, it serves as a "live well" for carrying the bait or fish. Also, because water is relatively heavy, the bucket 10 is steady when placed on the ground.

The dual tubes 16 and 18 are attached upright to the bucket 10. A pair of second sleeves 30 and 32 are slipped over upper ends of the tubes 16 and 18, respectively. The second sleeves 30 and 32 are attached by elastic cords 34 and 36, respectively, to a roller 28 which is positioned at the apex of the handle 12. The elastic cords 34 and 36 may be either two separate short cords or a single long cord extending inside the roller 28 for connecting the second sleeves 30 and 32 together at opposite ends of the same long cord. Thus, FIG. 1 shows that the invention is portable by a single hand H in its disassembled condition.

In FIG. 2, the invention is shown in its assembled condition. The bucket 10 rests on the ground G and has its lid 14 secured thereon. Although both tubes 16 and 18 are shown, reference shall be made only to the tube 16 for the sake of simplicity. The tube 16 is fastened pivotally at its lower end by a bolt and nut arrangement 38 near to a bottom edge 11 of the bucket 10. At its upper end, the tube 16 is open and supports a handle portion of a conventional rod and reel fishing pole P having a line L. The tube 16 is inclined towards the water (not shown) at an angle A selected by the fisher from a vertical axis Y of the bucket 10. The tube 16 is retained in its inclined position by the first sleeve 20 and the second sleeve 30. The first sleeve 20 is secured at a midsection of the tube 16 by the bolt 24 that is, in turn, clamped to two pivotable front legs 40 and 42. Together, the tube 16 and the front legs 40, 42 form a tripod for holding the fishing pole P by its handle at the selected angle A.

In FIG. 3, the method for securing the first sleeve 20 at the midsection of the tube 16 is shown in two major steps. First, the sleeve 20 is slipped over the upper end of the tube 16 in a downward direction indicated by arrows D. Although not necessary, the sleeve 20 is shown with the bolt 24 and the two front legs 40, 42 already secured thereto. In the second step of the method, the two front legs 40, 42 are whirled around together in the direction of arrows C so as to tighten the bolt 24 and the sleeve 20 onto the tube 16 at a portion of its midsection selected by the fisher.

Figure 4:
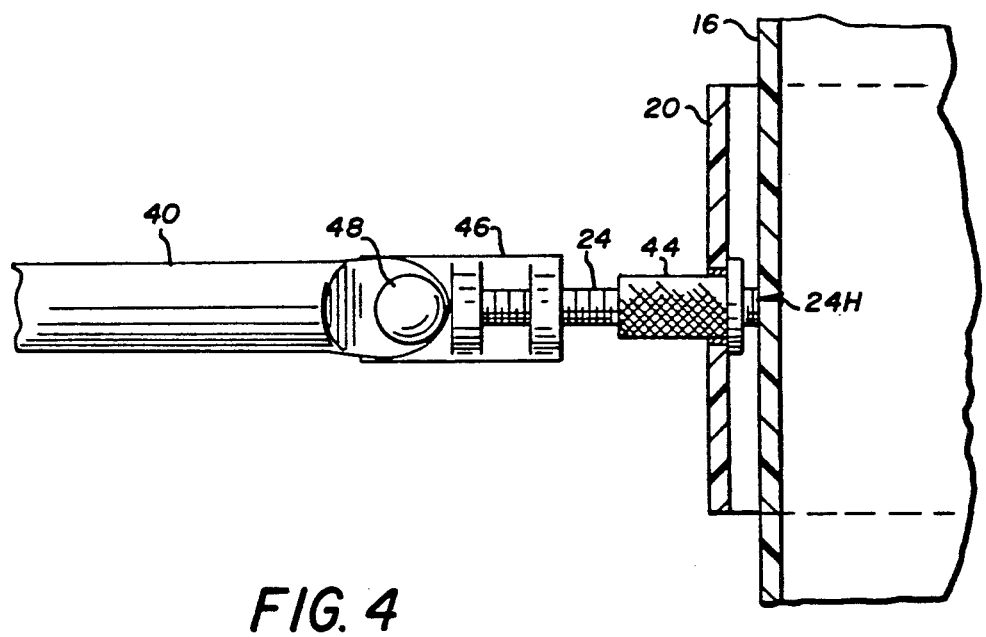
FIG. 4 is a partial cross-sectional view of the first sleeve tightened onto the tube.

In FIG. 4, the elements necessary for carrying out this second tightening step of the method for securing the first sleeve 20 to the tube 16 are shown in greater detail. At the right hand side of FIG. 4, the bolt 24 is shown as externally threaded. One end of the bolt 24 extends through an internally threaded bushing 44 fitted into a side wall of the sleeve 20 until its head 24H abuts against the midsection of the tube 16. At the left hand side of FIG. 4, an opposite end of the bolt 24 is secured tightly in a clamp 46 to which the legs 40, 42 are also secured tightly by a bolt and nut arrangement 48. For the sake of simplicity, only the leg 40 and the bolt of the bolt and nut arrangement 48 are illustrated in FIG. 4.

Thus, as the legs 40, 42 are whirled around in the direction of the arrows C seen in FIG. 3, the bolt and nut arrangement 48, the clamp 46, and the bolt 24 all turn together so that the bolt 24 may be threaded either into or back out of the bushing 44. When the head 24H of the bolt 24 abuts against the midsection of the tube 16, the sleeve 20 is frictionally retained over the tube 16 because the sleeve 20 has the non-rotating bushing 44 fitted tightly into its side wall.

Figure 5:
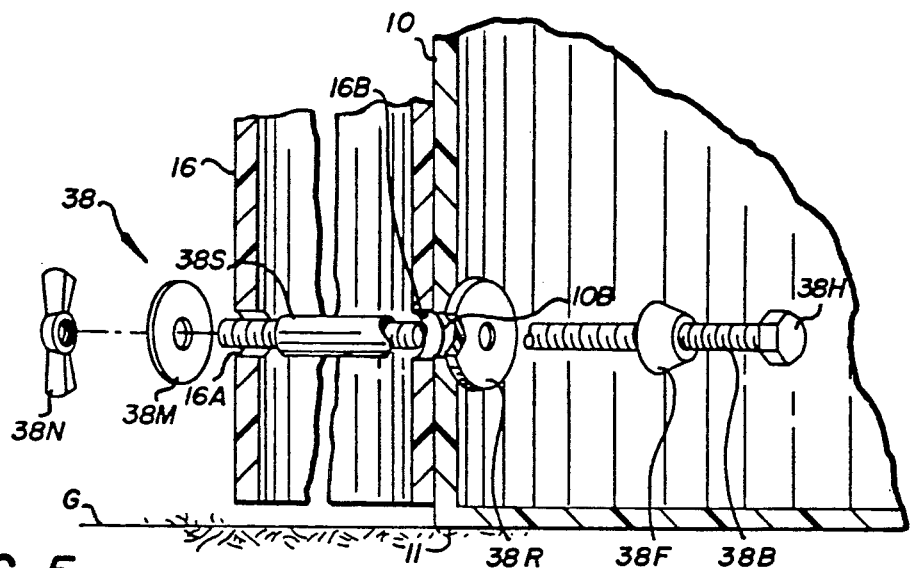
FIG. 5 is an exploded partial cross-sectional view of a device for fastening one end of the tube to a fish bucket.

In FIG. 5, the bolt and nut arrangement 38 of FIG. 2 is shown in greater detail. The arrangement 38 is located near the lower end of the tube 16 and fastens the tube 16 to the bucket 10 near its bottom edge 11. As shown in FIG. 2, the fisher may adjust the inclination of the angle A of the tube 16 relative to both the water (not shown) and the bucket 10 by pivoting tube 16 around the arrangement 38. As best shown in FIG. 5, a small vertical clearance is left between the ground G and the bottom of the tube 16. Thus, as seen in FIG. 2, the tube 16 may pivot smoothly around the arrangement 38 to a maximum angle of 90° from the vertical Y-axis towards the horizontal X-axis. Of course, the fisher would not want to incline the angle A of the tube 16 completely to 90° because the tube 16 would then be horizontal to the ground G and parallel to the X-axis. Nevertheless, this 90° angle is available for other purposes, such as storage of the bucket 10 in a space with a very low overhead clearance.

Referring now to the exploded details of the nut and bolt arrangement 38 shown in FIG. 5, it may be seen to comprise the following elements from left to right: a wing nut 38N, a metal washer 38M, a plastic spacer tube 38S, a rubber washer 38R, a plastic ferrule 38F, and a threaded metal bolt 38B having a metal head 38H. The bolt 38 extends through a bore 10B in the side wall of the bucket 10 and also through bores 16A, 16B in opposite side walls of the tube 16. The end of the bolt 38B opposite the head H has the wing nut 38N threaded thereon. Since the spacer 38S is made of plastic, it is pliable and fits readily at one end into the bores 10B and 16B so as to prevent water from leaking out of the fish bucket 10. Furthermore, the rubber washer 38R and the plastic ferrule 38F aid in preventing this leakage out from inside the bucket 10. When all elements comprising the arrangement 38 are compressed together on the bolt 38B, the bucket 10 is made leakproof.

Figure 6:
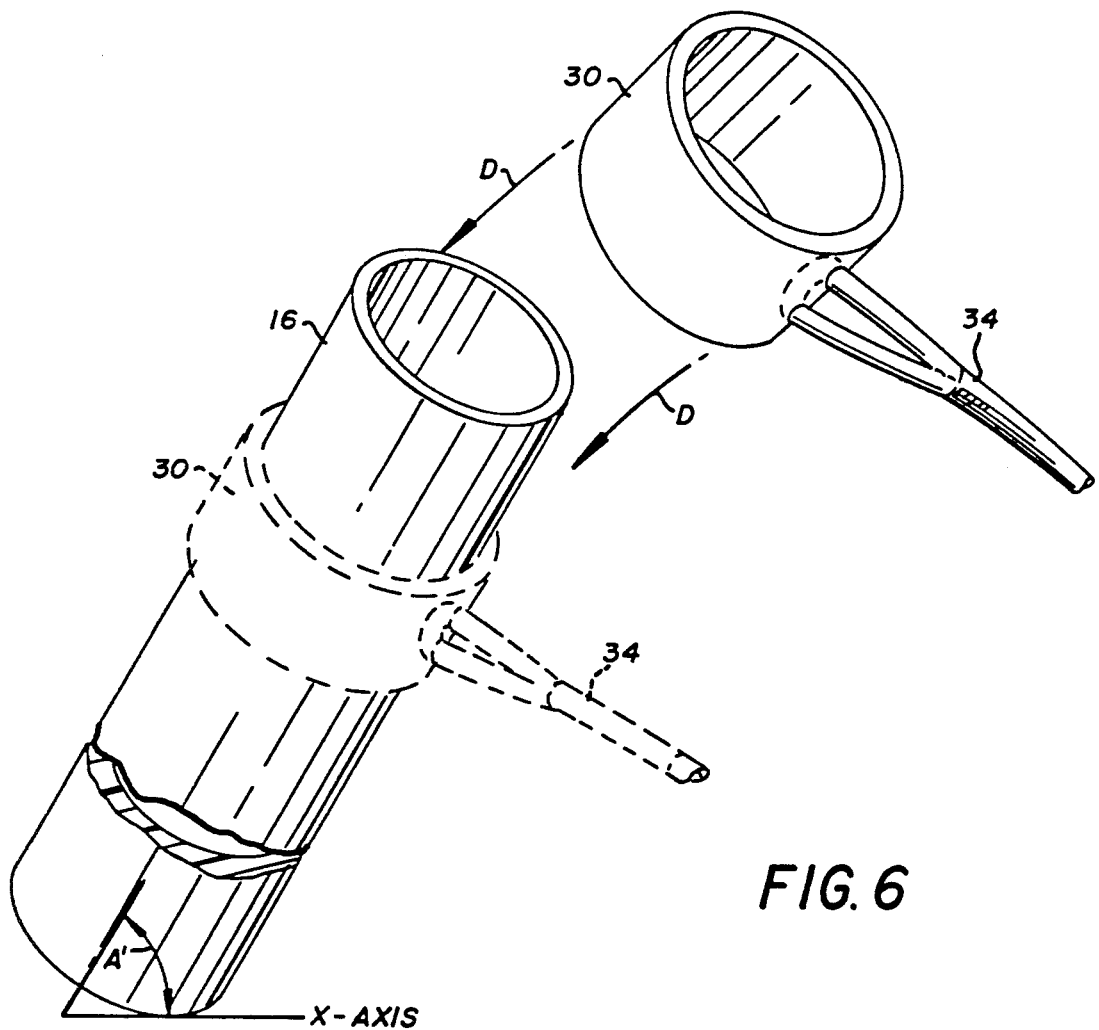
FIG. 6 is a perspective view of a second sleeve being slipped over the tube.

In FIG. 6, the method for securing the second sleeve 30 near to the upper end of the tube 16 is shown in a single step. Essentially, the sleeve 30 is slipped over the upper end of the tube 16 in the downward direction indicated again by arrow D. The elastic cord 34 is stretched out from the roller 28 (not shown in FIG. 6, but see FIG. 1) so that the tube 16 is retained at its upper end at an inclined complementary angle A' selected by the fisher.

Figure 7:
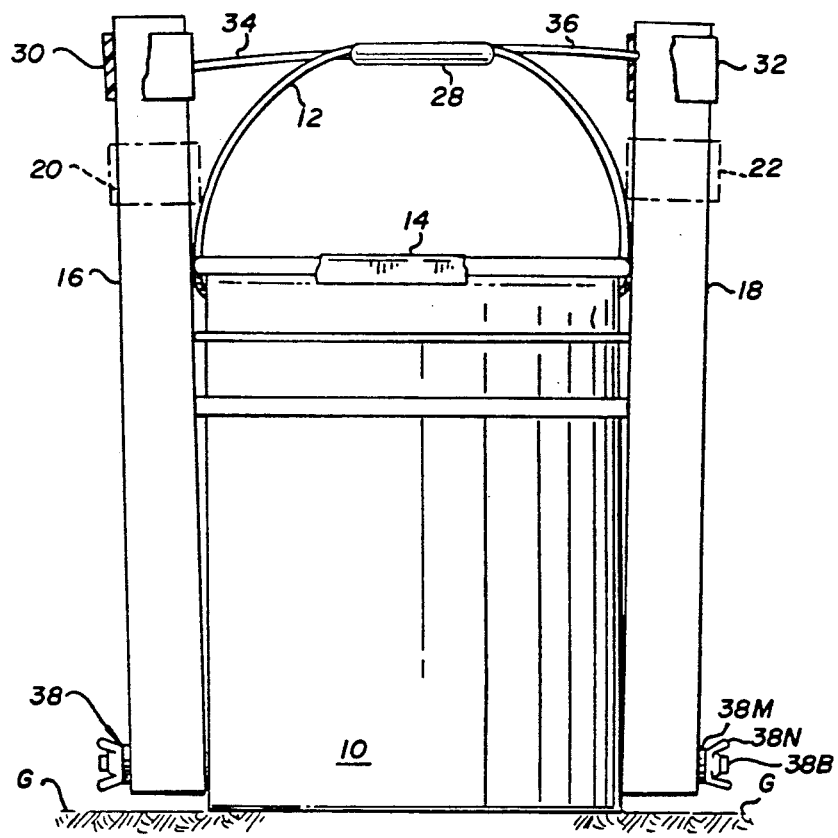
FIG. 7 is a rear elevational view of the invention in its assembled condition on the ground.

In FIG. 7, a rear view of the invention is shown in its assembled condition. This rear view is less complex and easier to understand than a front view.

Figure 8:
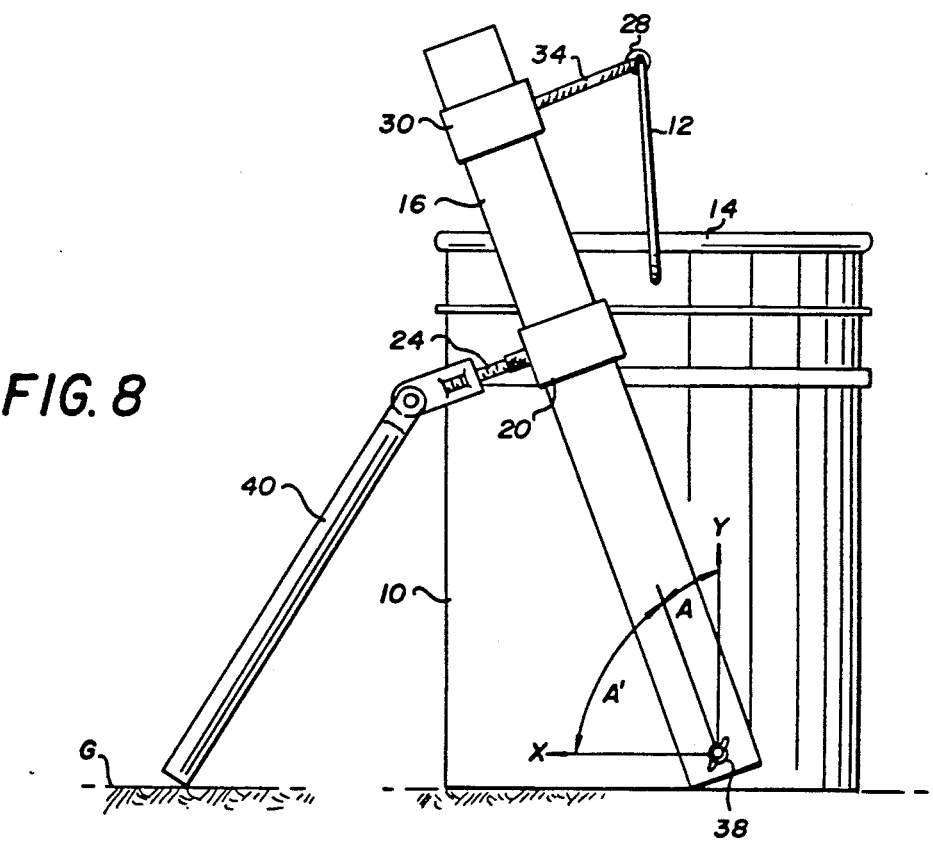
FIG. 8 is a side elevational view of the invention in its assembled condition on the ground.

In FIG. 8, a close-up side view of the invention is shown, also in its assembled condition.

The assemblage of the invention will now be described with reference to FIGS. 7 and 8. Initially, the bucket 10 is placed on the ground G. The bolt and nut arrangement 38 is tightened to make the bucket 10 leakproof. The bucket 10 is then filled with water to a desired level. Thereafter, the first sleeve 20 is slipped over the upper end of the tube 16 and is slid down to the midsection thereof, as previously described in regard to FIG. 3. The angle A is then selected by the fisher and the bolt 24 is tightened against the tube 16 by whirling the front legs 40 and 42 therearound, as previously described in regard to FIG. 3. The front legs 40 and 42 are then spread apart to form a tripod with the tube 16. Next, the elastic cord 34 is stretched from the roller 28 so that the second sleeve 30 may be slipped over the upper end of the tube 16. The handle 12 of the bucket 10 is then rotated above the lid 14 to a position where a fishing pole (not shown) may be inserted into the upper end of the tube 16. Thereafter, a second fishing pole (also not shown) may be inserted in the upper end of the second tube 18. Because the bucket 10 is partially filled with water, the fishing poles will be steady in the upper ends of the tubes 16 and 18.

The foregoing preferred embodiment is considered illustrative only. Numerous other modifications will readily occur to those persons skilled in the art of fishing after reading this specification.

For example, the size of the bucket 10 can vary to hold more or less water, either with or without bait and caught fish. Likewise, the diameters of the tubes 16 and 18 can be different so as to accommodate two fishing poles P having handle portions of different thicknesses.

Consequently, the disclosed invention is not limited by the exact construction and operation shown and described above, but rather is defined by the claims appended hereto.

What I claim as my invention is the following:
1. A fishing device comprising:
   a. a portable bucket;
   b. two tripods attached on opposite sides of the bucket, each of the tripods having two front legs pivotally connected by a first sleeve to a tube means for holding a single fishing pole by a handle thereof; and
   c. means for securing each of the tripods to the bucket.
2. The fishing device according to claim 1, wherein:

said bucket includes a handle and a roller thereon.

3. The fishing device according to claim 1, wherein:
said two front legs of each of the tripods are attached to the first sleeve by a threaded bolt having at one end a bushing fitted into a side wall of the first sleeve and also having at an opposite end a clamp secured tightly by a nut and bolt arrangement to the two front legs.

4. The fishing device according to claim 1, wherein:
said securing means includes a second sleeve slipped over an upper end of the tube means and fastened by an elastic cord to the handle of the bucket.

5. The fishing device according to claim 1, wherein:
said securing means includes leakproof means for allowing the tube means to be pivotally inclined at a selected angle from a vertical axis of the bucket.

6. The fishing device according to claim 5, wherein:
said leakproof means for allowing the tube means to be pivotally inclined is a nut and bolt arrangement.

7. The fishing device according to claim 1, wherein:
said securing means includes a leakproof nut and bolt arrangement connected through a lower end of the tube means near to a bottom edge of the bucket.

* * * * *